April 10, 1951　　　　　B. J. LAZAN　　　　　2,548,381
FATIGUE TESTING MACHINE
Filed Aug. 28, 1945　　　　　　　　　　　　　　8 Sheets-Sheet 1

INVENTOR
Benjamin J. Lazan
BY
ATTORNEY

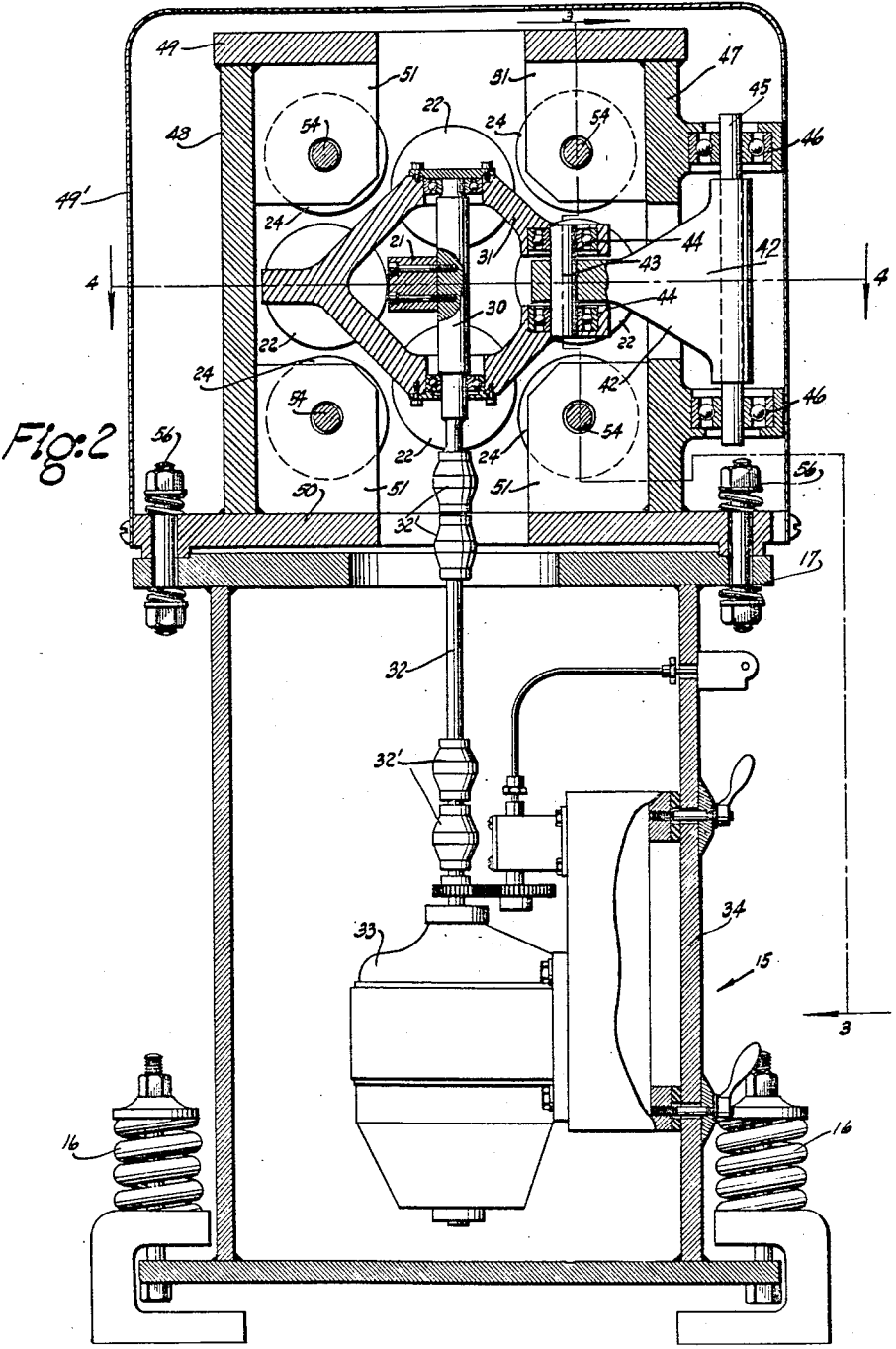

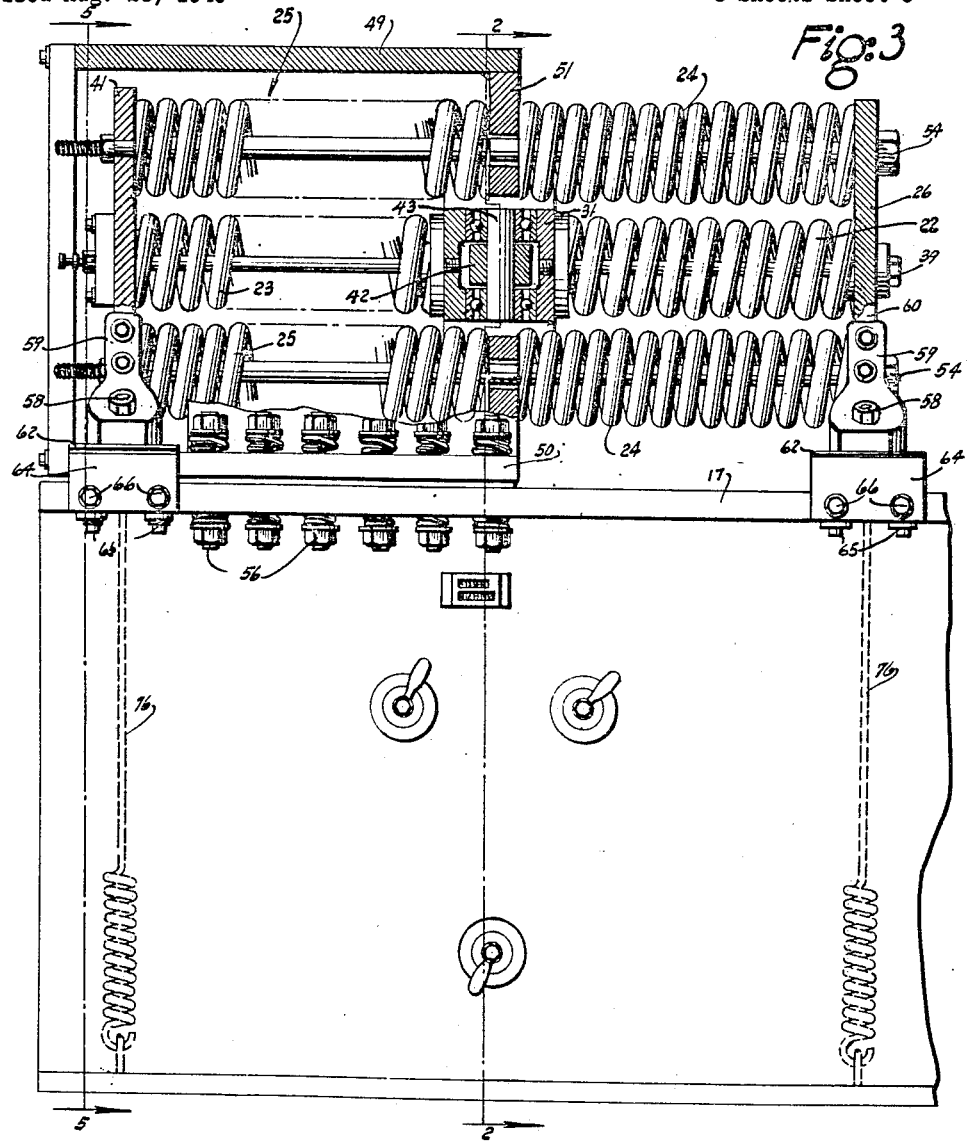

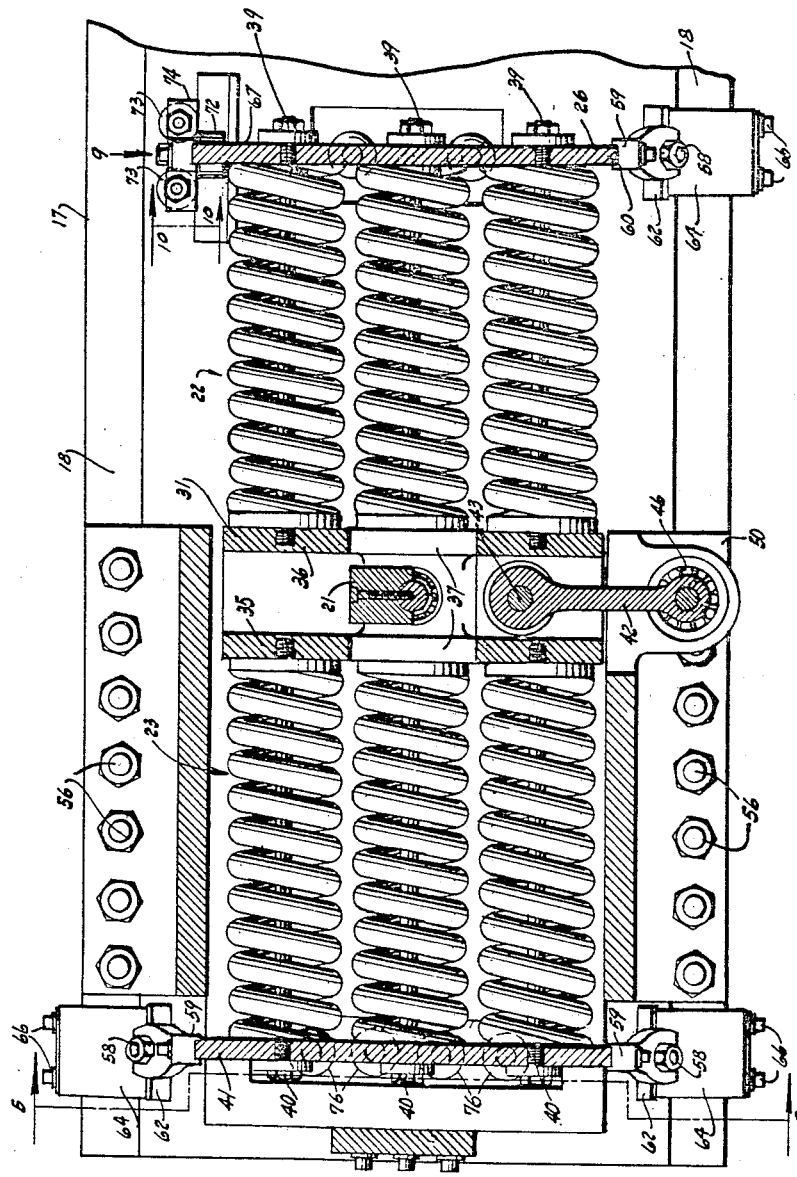

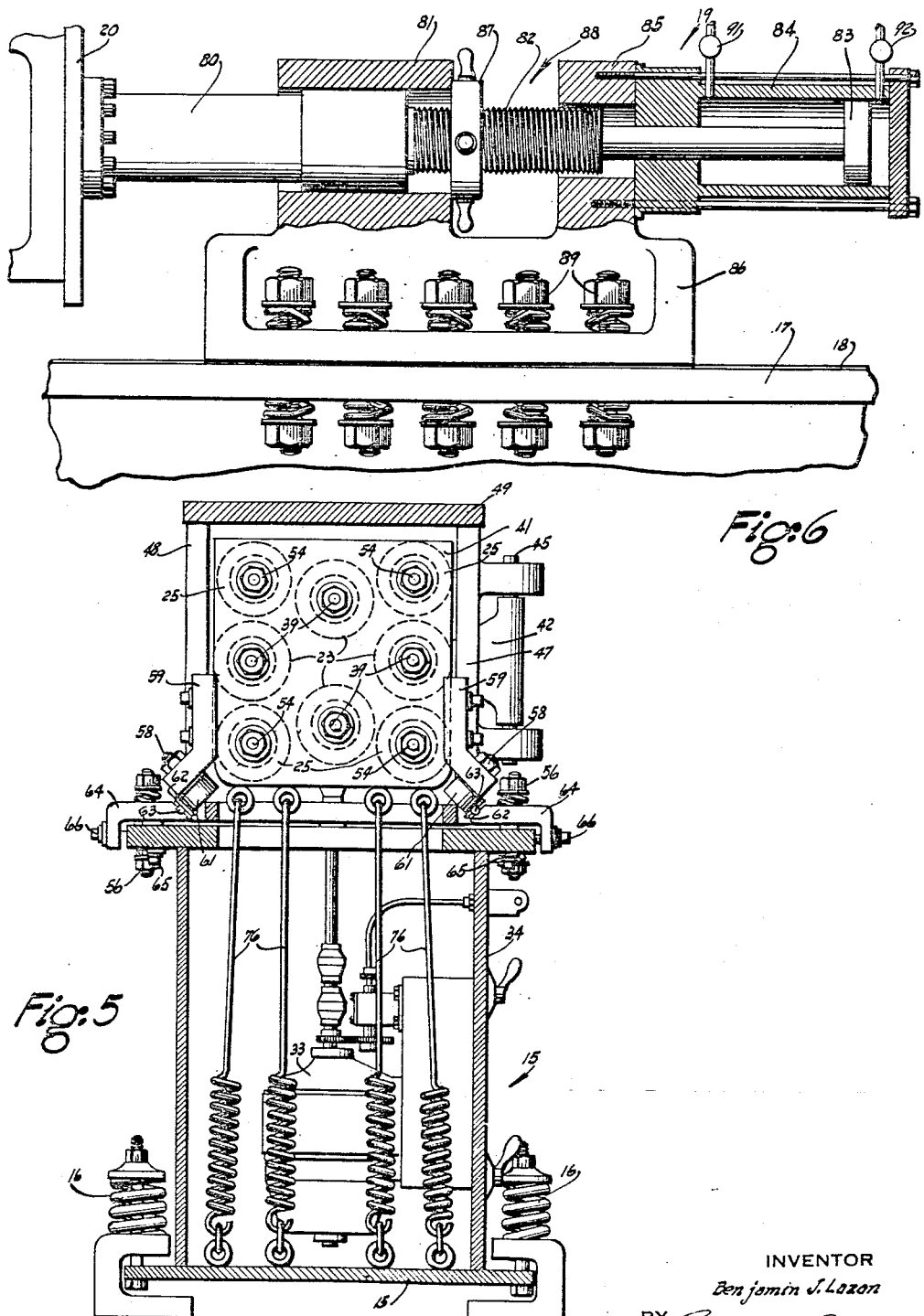

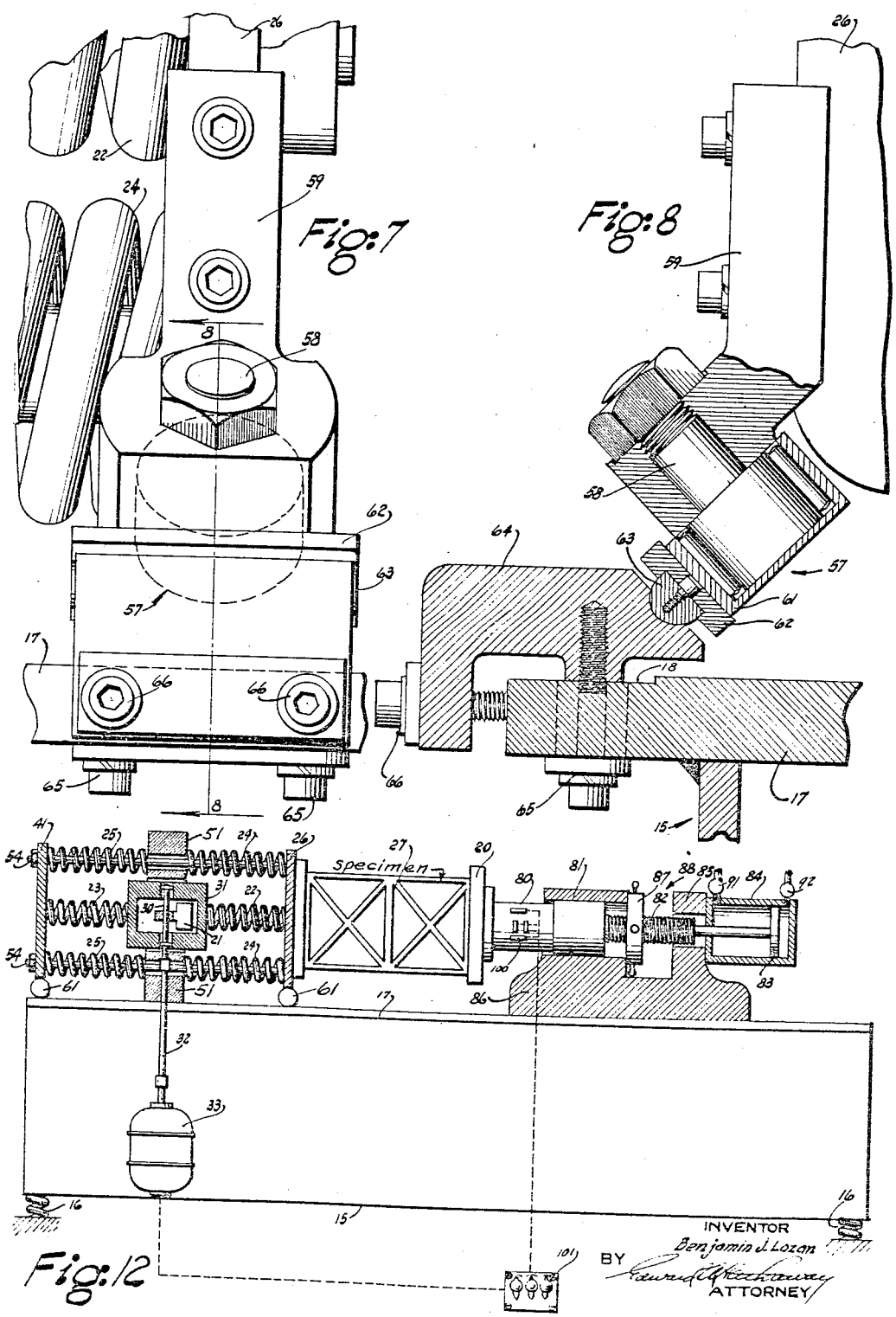

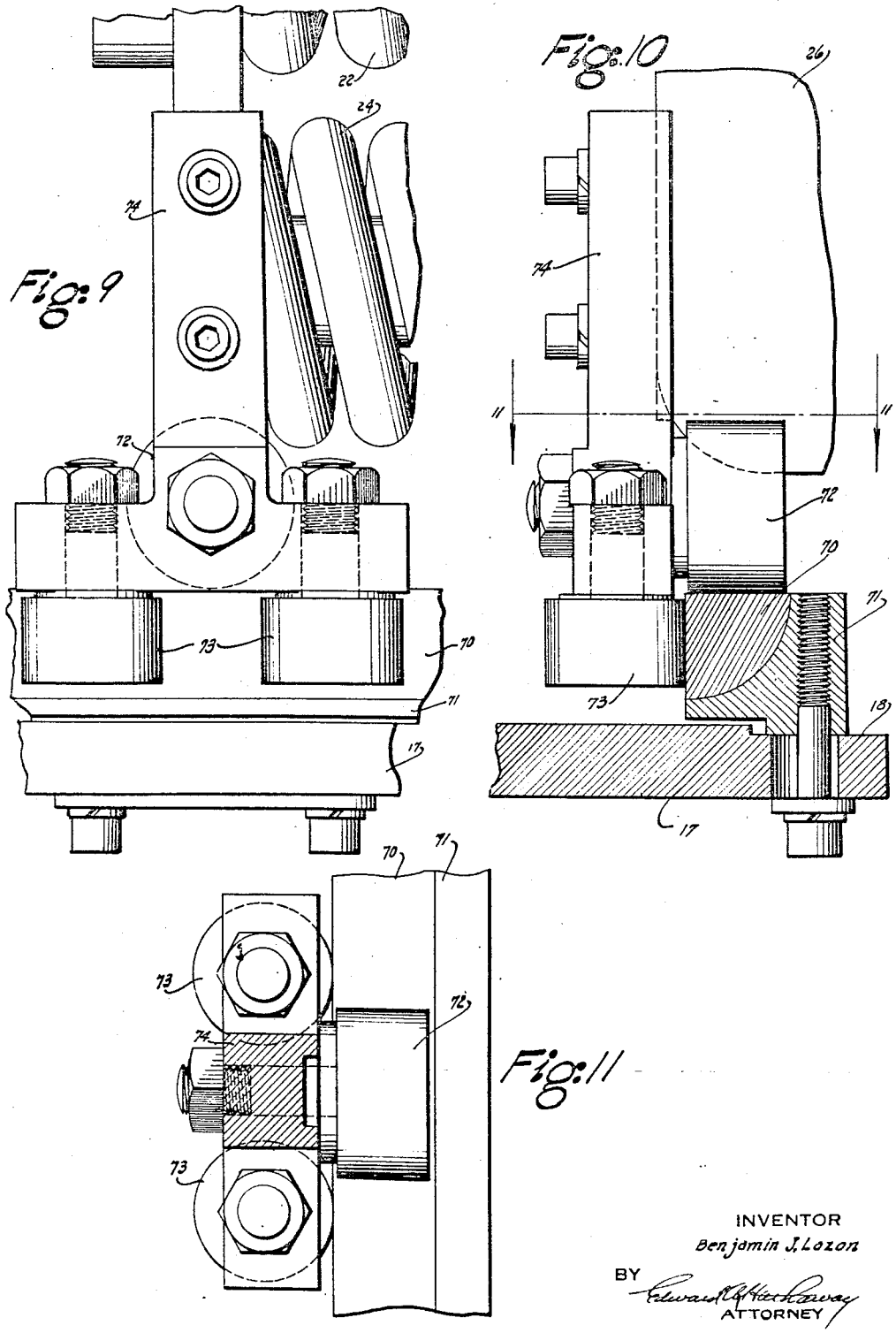

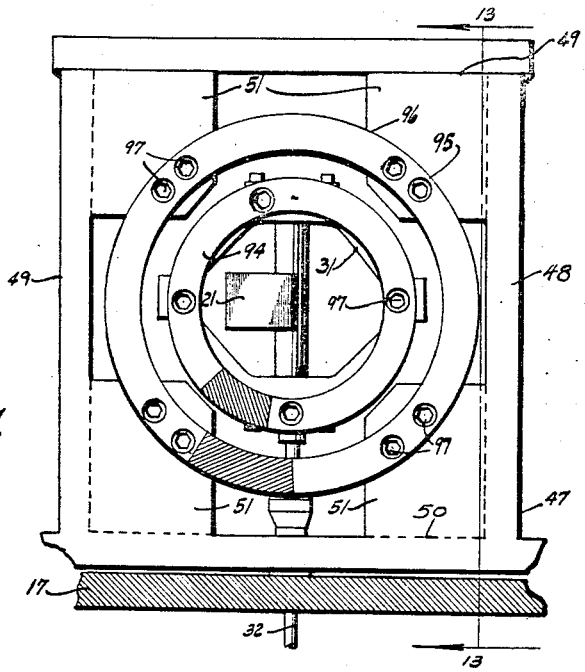
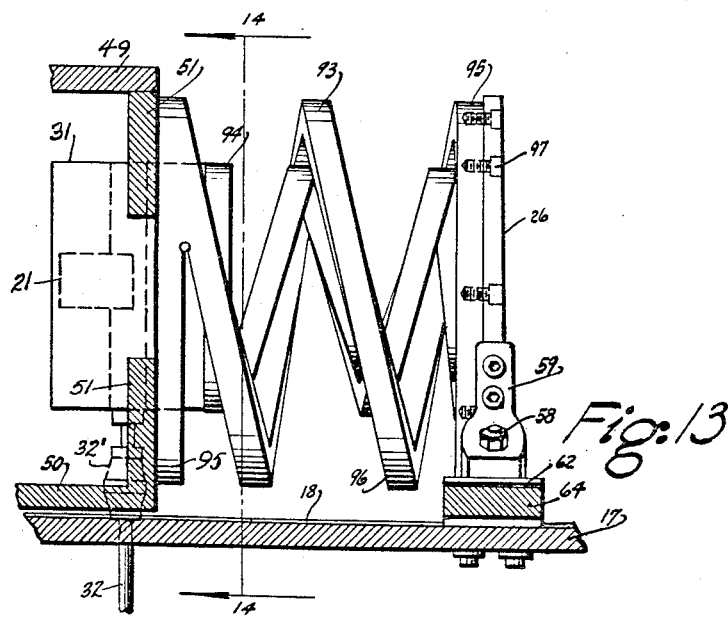

Patented Apr. 10, 1951

2,548,381

UNITED STATES PATENT OFFICE 2,548,381

FATIGUE TESTING MACHINE

Benjamin J. Lazan, Greenwich, Conn., assignor to Baldwin-Lima-Hamilton Corporation, a corporation of Pennsylvania Application August 28, 1945, Serial No. 613,047

11 Claims. (Cl. 73—67)

This invention relates generally to materials fatigue testing machines and more particularly to testing machines in which a vibratory loading mechanism of the resonant type is employed.

In certain types of fatigue testing machines a centrifugal weight or other primary force producing element transmits its alternating force directly to a specimen so that the loading force thereon is identical to the magnitude of the centrifugal force. The capacity of such a machine is limited to the amount of this primary force and to overcome this limitation it has been customary to employ a resonant type force generating means in which a small primary force is increased many times by the resonant action of an associated amplifying means. Such resonant type devices as heretofore proposed and used have been deficient in many respects either from an economic, functional or structural standpoint, well-known to those skilled in the art.

One object of my invention is to provide an improved resonant type fatigue testing machine that is adapted in a relatively direct and effective manner to produce a resonant alternating force. Another object is to provide improved means in such a machine for completely or partially applying such force to a specimen or applying it as a uni-directional alternating stress in either tension or compression or for applying any alternating force superimposed over any average preload within the capacity of the machine.

A further object is to provide an improved resonant type fatigue testing machine that, considering the type of machine, its capacity and the nature of tests to be performed, is relatively simple and economical in construction, operation and maintenance, is compact and rugged combined with freedom and flexibility of action necessary to allow generation of a resonant force and is capable by its cooperative combination of elements to have ample space for testing relatively large assemblies while at the same time being easily adjustable for different specimen lengths. Many elements functionally cooperate to accomplish the foregoing and other objects and these elements present a structural unit having a high degree of effectiveness and coordinated operation.

In accomplishing the stated objects as well as others which will be apparent to those skilled in the art from the disclosure herein, I have provided in one specific aspect of the invention a stationary platen and a reciprocating platen between which a test specimen is held. Attached to the reciprocating platen is a preloading spring system and also a resonant spring system which is activated by a relatively small centrifugal force type oscillator to cause greatly amplified test forces to be produced. The specimen can be initially preloaded under a static force preferably by a hydraulic piston and cylinder for applying load in the direction of compression or tension, as desired. The preload force is transmitted from the cylinder through the stationary platen and specimen to the reciprocating platen and thence to the set of preload springs which are very flexible so that small changes in deflection in the specimen do not appreciably alter the magnitude of the preload. Both the preload which is of a static nature and the dynamic test forces are measured by any suitable dynamometer which is adapted to control the speed of rotation of the centrifugal force oscillator and therefore the applied testing force. One such dynamometer and its control are disclosed in my copending application Serial No. 568,110, now Patent Number 2,496,632, hence the description of the same need not be repeated here in detail, although it preferably constitutes an element of my present apparatus. While my invention is shown particularly in connection with a resonant type fatigue machine, yet certain features are applicable to fatigue machines of other types.

Other objects and advantages will be more apparent to those skilled in the art from the following description of the accompanying drawings in which:

Fig. 2 is a transverse section taken substantially on the line 2—2 of Fig. 3;

Fig. 3 is a longitudinal section of the force generator and spring systems taken substantially on the line 3—3 of Fig. 2;

Fig. 4 is a horizontal section taken substantially on the line 4—4 of Fig. 2;

Fig. 5 is a transverse section taken substantially on the line 5—5 of Figs. 3 and 4;

Fig. 6 is a vertical section taken substantially through the axis 6—6 of the preloading mechanism of Fig. 1;

Fig. 7 is an enlarged side elevation of one of the guiding rollers at the right end of Fig. 3;

Fig. 8 is a transverse section taken on the line 8—8 of Fig. 7;

Fig. 9 is a side elevation of the torsional resisting guiding rollers viewed in the direction of arrow 9, Fig. 4;

Fig. 10 is a section taken substantially on the line 10—10 of Fig. 4;

Fig. 11 is a plan view taken substantially on the line 11—11 of Fig. 10;

Fig. 12 is a diagrammatic outline of my improved machine;

Fig. 13 illustrates a modified spring system employing a single large diameter spring in place of a group of springs; and Fig. 14 is a cross-section taken substantially on line 14—14 of Fig. 13.

Figure 1:
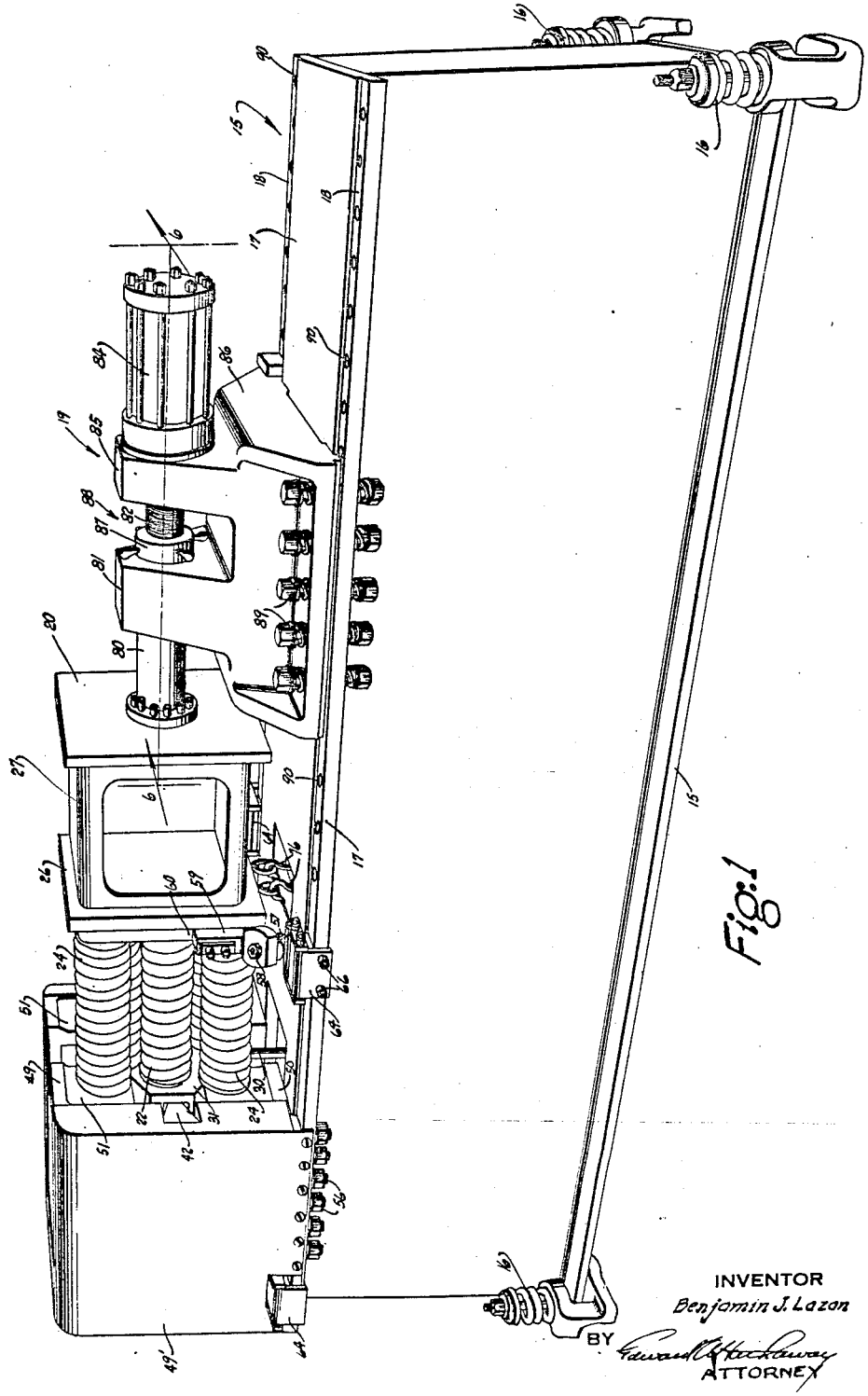
Fig. 1 is a perspective of the front side of my improved machine.

In the particular embodiment of the invention disclosed herein for purposes of illustration, I have shown in Fig. 1 a base generally indicated at 15 preferably of welded built-up structural plates and shapes having an appreciable vertical height for rigidity and of such length as to accommodate desired lengths of specimens. The relatively heavy base is mounted upon suitable seismic spring supports 16 at each of its four corners while the upper base plate 17 has suitable guideways 18 to support a longitudinally adjustable preloading mechanism generally indicated at 19 provided with a normally stationary specimen engaging platen 20. The preloading mechanism will be described in detail later on.

*Force generating mechanism.*—My improved force generating mechanism comprises essentially four main elements consisting of, as shown in Figs. 2 and 4, a centrifugal weight 21, double acting spring means specifically shown as two sets of opposed resonant springs 22, 23, another double acting spring means also specifically shown as two sets of opposed preloading springs 24 and 25, Fig. 3, and movable plates, one of which is a specimen engaging platen 26 for transmitting the alternating spring force to a specimen 27, Fig. 1, and the other plate 41 is a support for the outer ends of certain of the springs.

As shown in Fig. 2, the centrifugal weight 21 is secured to a vertical shaft 30 suitably journalled in a hollow floating frame 31 and driven through universal joints 32' and shaft 32 by an electric motor 33 which is suitably supported upon a side wall 34 of the stationary base 15. The floating frame 31, as shown in Fig. 4, is formed of spaced vertical walls 35 and 36 connected together and between which the centrifugal weight 21 freely rotates although suitable openings 37 are provided in said walls to allow lateral clearance for the rotating weight. The floating frame also provides necessary seats for the sets or nests of resonant springs 22 and 23, each set of which is specifically shown as four in number, Fig. 2. The springs 22, Figs. 3 and 4, are given a desired degree of initial compression by the provision of tie bolts 39 connected to the floating frame 31 and the movable specimen engaging platen 26. Similarly, the springs 23 are initially compressed by tie bolts 40 connected to the floating frame 31 and to a rear spring plate 41. To laterally guide the floating frame 31 and thereby stabilize the nests of springs, I have provided, as shown in Figs. 2 and 4, a laterally extending swinging arm 42 connected at its inner end to a vertical pivot pin 43, which in turn, is journalled in bearings 44 of the floating frame, Fig. 2, while the outer end is secured to a relatively long vertical pivot rod 45 mounted in suitable bearings 46 on the side wall 47 of a stationary longitudinal frame. This latter frame, in effect, provides abutments for supporting the inner ends of preloading springs 24 and 25, Fig. 3, and additionally includes a second side wall 48 connected to wall 47 by top and bottom plates 49 and 50. A relatively rigid box-like frame is thus provided in which four abutments 51 are secured as by welding, the springs 24 and 25 seating on these abutments. The sets of springs 24 and 25 are initially compressed by tie bolts 54 which extend from specimen platen 26 continuously and freely through spring seat abutments 51 to the spring plate 41. The sets of preload springs 24 and 25 are shown as specifically four in number suitably nested at the corners of the resonant springs 22 and 23. Frame 47—49 has a sheet metal cover 49'.

The box-like frame 47—49, Fig. 2, is held rigidly to the base by bolts 56 disposed along each side of the base 50 as shown in Figs. 3 and 4. The platen 26 and plate 41 are guided during reciprocation at their lower corners by rolling bearings. Three of these guides are of the single roller type shown in Figs. 7 and 8, and comprise preferably a needle bearing 57 whose stud 58 is connected to the inner bearing race secured in a bracket 59 which, in turn, is bolted to the two lower corners of spring plate 41 and to one lower corner 60, Fig. 4, of platen 26. The bearing axis is placed at a 45° angle so that its outer race 61 rides upon a hardened longitudinally flat seat 62 provided with a longitudinally extending semi-cylindrical support 63. The support 63 is seated in an adjustable bracket 64 suitably secured to base plate 17 by stud and slot connections 65 while screws 66 effect lateral adjustment of the support 64. The semi-cylindrical support 63 permits the roller and guide 62 to be brought easily into perfect line contact with each other across the full width of the outer race 61. The angular disposition of the rollers 57 not only effectively vertically supports the weight of plate 41 and platen 26 as well as that of the various springs, but also laterally guides such elements. However, to resist any torsion that might be induced in specimen platen 26 and at the same time support the other lower corner 67 of plate 26, I have provided a combined supporting and torsional resisting roller guide shown in Figs. 9 to 11. In Fig. 10, which is a section taken on line 10—10 of Fig. 4, a longitudinally extending quartered circular guide 70 is seated in a support 71 which is laterally adjustable on base plate 17. The horizontal surface and the vertical surface of member 70, disposed at right angles to each other, are respectively engaged by one needle type roller 72 and two such rollers 73 disposed on each side of the single roller. These rollers, similar in construction to roller 57 of Fig. 8, are secured in a bracket 74 attached to platen 26. This roller arrangement resists torsional effects about an axis lengthwise of the machine while at the same time providing a vertical support for that corner of the platen. The quartered circular seat for guide 70 automatically insures line contact with the two sets of rollers.

Complete freedom of vibratory movement of plate 41 and platen 26 is obtained by employing yieldable means for supplying a downward guiding force on the rollers. Such means is shown in Figs. 3 and 5 as front and rear sets of vertically extending springs 76 connected to the bottom of base 15 and to the lower edges of plates 41 and platen 26. The distance between the upper and lower points of connection of these springs is sufficiently great compared to the extent of vibratory movement that a substantially constant guiding force is maintained on the rollers. The resilient nature of the holding down or guiding springs 76 also prevents and undesirable chattering such as might arise if upper and lower mechanical guiding surfaces were employed for each roller. My improved arrangement is conducive to ease in assembly as well as automatic establishment and maintenance of precision alignment and contact between the rollers and surfaces thereby being conducive to minimum wear and tear as well as quiet operation.

*Preloading mechanism.*—As shown in Figs. 1 and 6, the preloading mechanism comprises a dynamometer shaft section 80 having a preferably enlarged boss slidably guided in a stationary support 81. The normally stationary platen 20 is bolted or otherwise secured to one end of the dynamometer shaft while the other end thereof has a threaded section 82 and a piston 83 movable in a hydraulic cylinder 84. This cylinder is suitably secured to a boss 85 supported with guide 81 on a common base 86. An enlarged nut 87 with suitable hand grips is threaded on shaft 82 and located in an enlarged space 88 between the portions 81 and 85. The preloading mechanism 19 may be adjustably secured at any selected points on base 17 by bolts 89 and a series of holes 90 in plate 17. Fluid pressure from any suitable source may be supplied to or exhausted from either end of cylinder 84 through suitable valve control passages 91 and 92.

*Modified single spring arrangement.*—In place of the multiplicity of preloading and resonant springs in the preferred form, I may employ, as shown in Fig. 13, a single large diameter preloading spring 93 and a single concentrically located large diameter resonant spring 94. These springs are preferably formed at their ends as continuous circular rings whereby, if desired, the last coil 96 will be an integral part of the entire circle 95. In any event, the continuous circled end 95 may be easily machined to provide a large and excellent surface contact with the parts 26, 51 and 41, Fig. 3, so that any possible chattering is minimized or eliminated. In addition, the broad principles of this construction allow the circled end of the springs to have a very low stress and accordingly such ends may be effectively secured by a series of circular studs 97 to the parts 26, 51 and 41. These concentric springs can be employed, on only one side of member 51 as is shown in Fig. 13 instead of on both sides as is the case with the multiple spring arrangement of Fig. 3. This is possible for the reason that these single large springs are of a two-directional nature capable of being used either in tension or in compression whereas the multiple coil springs can be used only in compression. Hence, it is possible for the concentric design of springs to employ only one preload spring 93 and one resonant spring 94 rather than two sets of such springs, one on each side of the centrifugal weight as shown in the multiple spring arrangement. In addition to the advantage that the two-directional springs eliminate the need for a second set of opposed springs there is also the advantage that the lateral stiffness of the two-directional springs is much greater than their longitudinal stiffness so that it would be possible to eliminate lateral guide 42 between the oscillating head and the stationary frame. The two-directional springs minimize noise and general slapping contact between the movable platens and the circular base of the springs. The nature of the spring construction is such that it may have only a few coils whose spacing may be a minimum if desired dictated by the amplitude of movement, and they may be cast, machined or forged.

*Operation.*—The operation can be more readily understood from the diagrammatic outline of the machine, Fig. 12. The test specimen 27 is first suitably gripped or fastened between stationary platen 20 and the reciprocating platen 26. A predetermined static preload is then imposed upon the specimen by first screwing nut 87 away from support 81 and then supplying fluid under increasing pressure to the right end of cylinder 84 to impose an axial force on dynamometer bar 80. The desired degree of preloading force may be determined by measuring the deflection in the preload springs 24 with a dial indicator or other suitable deflection indicating means or by employing any suitable force sensitive dynamometer in which the force sensitive pick-up may be a quartz crystal, piezo-electric capsule, or strain gages of the magnetic, capacitance, optical or wire resistance type. For purposes of illustration such pick-ups are diagrammatically indicated at 100 on dynamometer shaft 80, although it will be understood that these pick-ups are primarily intended for measuring the alternating dynamic forces. In case wire resistance strain gages are employed they are preferably of the bonded wire resistance type shown in Patent 2,292,549 in which the electrical resistance of the wire varies in accordance with the strain of shaft 80. Certain of these gages have their wires extend lengthwise of the shaft and others transversely thereof and also at least two sets of gages are uniformly circumferentially spaced around the shaft to eliminate bending moments as well as to obtain proper temperature compensation. The gages are suitably connected together to form a bridge circuit which may be connected to any suitable amplifier or other electronic controls generally indicated at 101. This control not only indicates the static preload but also controls the speed of motor 33 to hold the amplified force well up on the resonant curve very near but slightly below the resonant peak. One form of electronic and speed control for accomplishing these operations is disclosed in my copending application Serial No. 568,110, filed December 14, 1944. As the preload force builds up in shaft 80 due to increasing fluid pressure supplied to cylinder 84 the gages 100 will respond to the magnitude of this load and when it has reached the desired value the fluid supply pipe is closed to hold the pressure constant and the nut 87 is screwed firmly against support 81. Thereupon the fluid supply pipe is opened and fluid under sufficient pressure is applied to the right end of cylinder 84 to tightly hold the lock nut 87 against support 81 with a force greater than the maximum alternating force applied to the specimen during testing. The foregoing preload is in compression but in a similar manner a tension preload may be imposed on the specimen by supplying fluid to the left end of cylinder 84. Any preload applied to the specimen is transmitted through the reciprocating platen 26 to preload springs 24 and 25 which are sufficiently flexible so that small changes in deflection in the specimen do not appreciably alter the magnitude of the preload. The preload springs are seated against relatively stationary abutments 51 and tied together by common tie bolts so that the platen 26 and plate 41 operate as a unit under the action of the springs. The springs are sufficiently initially compressed by the tie rods 54, Fig. 3, so the springs on each side of the abutments 51 are able to take care of any desired compression or tension preload, the springs on one side being compressed and on the other side elongated, or vice versa, during operation. The centrifugal weight 21 is then rotated by motor 33. The centrifugal force is transmitted through the floating frame 31 which reciprocates longitudinally with the rotation of the centrifugal weight. This floating frame transmits its motion and force through resonant springs 22 and 23 alternately to specimen platen 26 and plate 41 thereby imparting an alternating force and reciprocating movement to platen 26 to similarly load the test specimen. The resonant springs 22 and 23 are of such stiffness, or conversely flexibility, as is necessary to produce a desired degree of resonant action to amplify the centrifugal force to the desired value. It is preferable that the preload springs are flexible so as to allow the reciprocating platen to vibrate with as little hindrance as possible which cannot be accomplished by stiff springs. The alternating force generated in the specimen 27 is controlled and maintained at a constant value by the strain gages 100 and electronic controls 101. It will be understood that the oscillator resonant spring system 21, 22 and 23 is adjusted to vibrate preferably on the upward branch on the resonance curve, near resonance but always below. If during operation the force in the dynamometer which is always the force in the specimen, is less than the desired value due to the occurrence of any one of various conditions, the output of the wire strain gages 100 will be accordingly less than the value for which the electronic controls are adjusted and the motor 33 will automatically speed up and increase the load on the specimen. If the load force is too high, the motor speed is reduced in a manner similar to but opposite to that above described, thereby resulting in a reduction in specimen force. Thus the desired specimen force is maintained constant within very close limits even though the physical properties of the specimen may change or the amplitude of movement varies with the constant force.

In further explanation of the relation between the preloading operation and the alternating force, it will be understood that the term alternating force is generally defined as one that fluctuates between two limits, usually in a sinusoidal manner. The sine wave has two alternating forces, one above and one below a mean force. In my fatigue machine the mean force, in either tension or compression, may be initially established by the static preloading mechanism, and the alternating component which is created by the centrifugal weight and transmitted to the reciprocating platen is then superimposed on such preload. On the other hand, if no preload is imposed on the specimen the mean force is zero so that the alternating force is what might be termed a reverse force operating alternately in tension and compression both of the same magnitude. Thus it is seen that my machine can excite an alternating force whose mean force can be anything from 0 to 10,000 pounds (in either tension or compression) and the superimposed alternating force can be anything from 0 to ± 10,000 pounds. Hence, the maximum capacity could be a 10,000 pound preload with a superimposed + 10,000 pound alternating force producing a total force of 20,000 pounds.

The cooperative arrangement of the many elements including among others the floating centrifugal housing or frame 31, lateral guiding arm 42 therefor, spring abutments 51, the combined guiding and torsion resisting rollers and the preloading mechanism are all so functionally coordinated as to insure a fatigue testing machine that has a high degree of flexibility in operation and adaptation for specimens of different sizes and lengths, that is relatively simple in that it does not require any gears, cranks, cams or force multiplying weighted levers, is compact considering the ability of the machine to amplify a 1000 pound centrifugal force of a 10 inch pound eccentric up to plus or minus 10,000 pounds at an operating speed of approximately 1800 R. P. M., is relatively silent in operation, and has a high degree of sensitivity, accuracy and durability.

It will of course be understood that various changes in details of construction and arrangement of parts may be made by those skilled in the art without departing from the spirit of the invention as set forth in the appended claims.

I claim:

1. A fatigue testing machine comprising, in combination, opposed specimen engaging members, mechanism for producing an alternating centrifugal force, a variable speed motor for driving the same, means for supporting said force producing mechanism so as to transmit an alternating force to one of said members independent of the deflection amplitude of the specimen, a dynamometer member connected to the other of said members so as to be responsive to the force transmitted through the specimen, force sensitive electrical means connected to said dynamometer so as to be responsive to the force transmitted therethrough, and means for controlling the speed of said motor by said force responsive electrical means so as to vary the motor speed to maintain a substantially constant load on a specimen independent of the deflection amplitude thereof.

2. The combination set forth in claim 1 further characterized by the provision of means for statically preloading the specimen through said dynamometer whereby the preload may be initially determined by said dynamometer and the alternating test force may be subsequently determined by said dynamometer.

3. A fatigue testing machine comprising, in combination, opposed specimen engaging members, an alternating force producing mechanism connected to one of said members, preloading piston and cylinder elements one of which is movable, said movable element being connected to the other of said members, an abutment adjacent said movable element, and limiting means connected to said movable element for movement therewith and adapted to be brought into engagement with said abutment when a predetermined preload is obtained thereby to prevent any further increase of preload.

4. A fatigue testing machine comprising, in combination, opposed specimen engaging members, an alternating force producing mechanism connected to one of said members, an axially adjustable shaft connected at one end to the other of said members and having a threaded portion at the other end, an abutment through which said shaft extends, a nut adjustable on said threaded end adapted to be brought into contact with said abutment so as to limit axial movement of the shaft in the direction of the specimen, and a hydraulic piston and cylinder operatively connected to the threaded end of said shaft whereby the shaft may be moved in a direction of the specimen to preload the same up to a point determined by engagement of said nut with its abutment.

5. A resonant type fatigue testing machine comprising, in combination, a reciprocating specimen engaging member that is vibratable along an axis, means for guiding said member along said axis during its vibration, mechanism for producing a primary alternating force, a vibratable frame for supporting said force producing mechanism and being reciprocable along said axis, said frame and mechanism constituting a single vibratable mass in which the whole frame and mechanism, in their entirety, freely vibrate with a uniform extent of bodily movement along said axis, axially resisting elastic resonant means connected at one end to said supporting frame so that the uniform bodily movement and alternating force of such frame is transmitted directly therefrom to said elastic means, means whereby the other end of said elastic means is connected to said specimen engaging member thereby to effect an axial resonant amplification of the alternating force directly from said frame to said specimen engaging member, a stationary member, axially extending preload coil spring means connected at one end to said stationary member and at the other end to said specimen engaging member, and means for producing a preload force on a specimen through which the force is then transmitted to said preload means.

6. A resonant type fatigue testing machine comprising, in combination, a reciprocating specimen engaging member that is vibratable along an axis, means for guiding said member along said axis during its vibration, mechanism for producing a primary alternating force, a vibratable frame for supporting said force producing mechanism and being reciprocable along said axis, said frame and mechanism constituting a single vibratable mass in which the whole frame and mechanism, in their entirety, freely vibrate with a uniform extent of bodily movement along said axis, axially resisting elastic resonant means connected at one end to said supporting frame so that the uniform bodily movement and alternating force of such frame is transmitted directly therefrom to said elastic means, means whereby the other end of said elastic means is connected to said specimen engaging member thereby to effect an axial resonant amplification of the alternating force directly from said frame to said specimen engaging member, a stationary member, axially extending preload coil spring means connected at one end to said stationary member and at the other end to said specimen engaging member, and means for producing either a tension or compression preload force on the specimen through which the force is then transmitted to said preload spring means.

7. A resonant type fatigue testing machine comprising, in combination, a reciprocating specimen engaging member that is vibratable along an axis, means for guiding said member along said axis during its vibration, mechanism for producing a primary alternating force, a vibratable frame for supporting said force producing mechanism and being reciprocable along said axis, said frame and mechanism constituting a single vibratable mass in which the whole frame and mechanism, in their entirety, freely vibrate with a uniform extent of bodily movement along said axis, axially resisting elastic resonant means connected at one end to said supporting frame so that the uniform bodily movement and alternating force of such frame is transmitted directly therefrom to said elastic means, means whereby the other end of said elastic means is connected to said specimen engaging member thereby to effect an axial resonant amplification of the alternating force directly from said frame to said specimen engaging member, stationary means, and axially extending combined tension-compression preload coil spring means connected at one end to said stationary member and at the other end to said specimen receiving member, and means for producing either a tension or compression preload force on a specimen through which the force is then transmitted to said axially extending preload spring means.

8. A resonant type fatigue testing machine comprising, in combination, a reciprocating specimen engaging member that is vibratable along an axis, means for guiding said member along said axis during its vibration, mechanism for producing a primary alternating force, a vibratable frame for supporting said force producing mechanism and being reciprocable along said axis, said frame and mechanism constituting a single vibratable mass in which the whole frame and mechanism, in their entirety, freely vibrate with a uniform extent of bodily movement along said axis, axially resisting elastic resonant means connected at one end to said supporting frame so that the uniform bodily movement and alternating force of such frame is transmitted directly therefrom to said elastic means, means whereby the other end of said elastic means is connected to said specimen engaging member thereby to effect an axial resonant amplification of the alternating force directly from said frame to said specimen engaging member, a spring supporting member located on the side of said vibratable frame opposite to that on which said specimen engaging member is located, axially extending means for connecting said members together so that they axially vibrate as a unit, said vibratable frame and said members being in axial alignment with each other, stationary means located in a transverse plane between said members, and axially extending preload coil spring means connected at one end to said stationary means and at the other end to said spring supporting member.

9. A resonant type fatigue testing machine comprising, in combination, a reciprocating specimen engaging member that is vibratable along an axis, means for guiding said member along said axis during its vibration, mechanism for producing a primary alternating force, a vibratable frame for supporting said force producing mechanism and being reciprocable along said axis, said frame and mechanism constituting a single vibratable mass in which the whole frame and mechanism, in their entirety, freely vibrate with a uniform extent of bodily movement along said axis, axially resisting elastic resonant means connected at one end to said supporting frame so that the uniform bodily movement and alternating force of such frame is transmitted directly therefrom to said elastic means, means whereby the other end of said elastic means is connected to said specimen engaging member thereby to effect an axial resonant amplification of the alternating force directly from said frame to said specimen engaging member, the means for axially guiding the specimen engaging member including axially extending guideways located along the longitudinally extending sides of said specimen engaging member, and needle bearings supported by said specimen engaging member and engageable with said guideways to vibrate thereon during operation of the machine.

10. A resonant type fatigue testing machine comprising, in combination, a reciprocating specimen engaging member that is vibratable along an axis, means for guiding said member along said axis during its vibration, mechanism for producing a primary alternating force, a vibratable frame for supporting said force producing mechanism and being reciprocable along said axis, said frame and mechanism constituting a single vibratable mass in which the whole frame and mechanism, in their entirety, freely vibrate with a uniform extent of bodily movement along said axis, axially resisting elastic resonant means connected at one end to said supporting frame so that the uniform bodily movement and alternating force of such frame is transmitted directly therefrom to said elastic means, means whereby the other end of said elastic means is connected to said specimen engaging member thereby to effect an axial resonant amplification of the alternating force directly from said frame to said specimen engaging member, the means for axially guiding the specimen engaging member including axially extending guideways located along the longitudinally extending sides of said specimen engaging member and transversely inclined toward each other to maintain axial guidance of said members, and needle bearings supported by said specimen engaging member and engageable with said guideways to vibrate thereon during operation of the machine.

11. A resonant type fatigue testing machine comprising, in combination, a reciprocating specimen engaging member that is vibratable along an axis, means for guiding said member along said axis during its vibration, mechanism for producing a primary alternating force, a vibratable frame for supporting said force producing mechanism and being reciprocable along said axis, said frame and mechanism constituting a single vibratable mass in which the whole frame and mechanism, in their entirety, freely vibrate with a uniform extent of bodily movement along said axis, axially resisting elastic resonant means connected at one end to said supporting frame so that the uniform bodily movement and alternating force of such frame is transmitted directly therefrom to said elastic means, means whereby the other end of said elastic means is connected to said specimen engaging member thereby to effect an axial resonant amplification of the alternating force directly from said frame to said specimen engaging member, the means for axially guiding the specimen engaging member including axially extending guideways located along the longitudinally extending sides of said specimen engaging member, and needle bearings supported by said specimen engaging members and engageable with said guideways, and holding-down spring means connected to said specimen engaging member to exert a yieldable force thereon in a direction to hold said needle bearings and guideways in firm contact with each other while at the same time the axis of such holding-down spring means is adapted to swing with the reciprocating vibratory movement of said specimen engaging member.

BENJAMIN J. LAZAN.

REFERENCES CITED

The following references are of record in the file of this patent:

UNITED STATES PATENTS

| Number | Name | Date |
| --- | --- | --- |
| Re. 22,416 | Eksergian | Jan. 11, 1944 |
| 1,526,045 | Brown | Feb. 10, 1925 |
| 1,952,379 | Lee | Mar. 27, 1934 |
| 2,215,958 | Fullerton | Sept. 24, 1940 |
| 2,220,164 | List | Nov. 5, 1940 |
| 2,361,396 | Gross | Oct. 31, 1944 |
| 2,496,632 | Lazan | Feb. 7, 1950 |

FOREIGN PATENTS

| Number | Country | Date |
| --- | --- | --- |
| 464,082 | Great Britain | Apr. 12, 1937 |
| 530,853 | Great Britain | Dec. 23, 1940 |